(12) United States Patent
Vaidyanathan et al.

(10) Patent No.: US 8,286,178 B2
(45) Date of Patent: Oct. 9, 2012

(54) ALLOCATION AND REGULATION OF CPU ENTITLEMENT FOR VIRTUAL PROCESSORS IN LOGICAL PARTITIONED PLATFORM

(75) Inventors: Basu Vaidyanathan, Austin, TX (US); Marcos A. Villarreal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 12/491,012

(22) Filed: Jun. 24, 2009

(65) Prior Publication Data

US 2010/0333087 A1    Dec. 30, 2010

(51) Int. Cl.
    *G06F 9/46*    (2006.01)
(52) U.S. Cl. ........................................ 718/104; 718/105
(58) Field of Classification Search .......................... None
    See application file for complete search history.

(56) References Cited

U.S. PATENT DOCUMENTS

| 7,228,546 | B1 | 6/2007 | McCarthy et al. | |
| 7,698,705 | B1* | 4/2010 | Czajkowski et al. | 718/1 |
| 2002/0087611 | A1* | 7/2002 | Tanaka et al. | 709/1 |
| 2007/0055830 | A1* | 3/2007 | Brenner | 711/153 |
| 2008/0077927 | A1 | 3/2008 | Armstrong et al. | |
| 2008/0244215 | A1* | 10/2008 | Flemming et al. | 711/173 |

* cited by examiner

*Primary Examiner* — Jennifer To
*Assistant Examiner* — Abdullah Al Kawsar
(74) *Attorney, Agent, or Firm* — Yudell Isidore Ng Russell PLLC

(57) ABSTRACT

A system, method, and computer program product for managing processor entitlement of virtual processors in logical partitioned data processing system. One embodiment of the invention provides a method of managing processing resources in a data processing system. The method involves creating a resource set comprising a grouping of virtual processors, and allocating a processing resource entitlement the resource set. The method also includes assigning the resource set to a workload, receiving a request by the workload for utilization of processing resources, and in response to receiving the workload request dispatching the assigned resource set. The method further includes determining whether the dispatched virtual processors of the resource set have exceeded the assigned processing resource entitlement, and in response to determining that the processing resource entitlement has been exceeded, undispatching the resource set.

9 Claims, 3 Drawing Sheets

ALLOCATION AND REGULATION OF CPU ENTITLEMENT FOR VIRTUAL PROCESSORS IN LOGICAL PARTITIONED PLATFORM

BACKGROUND OF THE INVENTION

1. Technical Field

This application generally relates to computer systems and more particularly to virtualizing computing resources. In particular, this application relates to allocation and regulation of processor entitlement for virtual processors in a logically partitioned data processing system.

2. Description of the Related Art

The speed and efficiency of many computing applications depends upon the availability of processing resources. To this end, computing architectures such as the "virtual machine" design share common processing resources among multiple processes. Such architecture may conventionally rely upon a single computing machine having one or more central processing units (CPUs). The CPUs may execute software configured to simulate multiple virtual processors.

BRIEF SUMMARY

Disclosed is a system, method, and computer program product for managing processor entitlement of virtual processors in logical partitioned data processing system. One embodiment of the invention provides a method of managing processing resources in a data processing system. The method involves creating a resource set comprising a grouping of virtual processors, and allocating a processing resource entitlement the resource set. The method also includes assigning the resource set to a workload, receiving a request by the workload for utilization of processing resources, and in response to receiving the workload request dispatching the assigned resource set. The method further includes determining whether the dispatched virtual processors of the resource set have exceeded the assigned processing resource entitlement, and in response to determining that the processing resource entitlement has been exceeded, undispatching the resource set.

The above as well as additional features and advantages of the present invention will become apparent in the following detailed written description.

BRIEF DESCRIPTION OF THE SEVERAL VIEWS OF THE DRAWINGS

The invention itself will best be understood by reference to the following detailed description of an illustrative embodiment when read in conjunction with the accompanying drawings, wherein.

DETAILED DESCRIPTION

Figure 1:
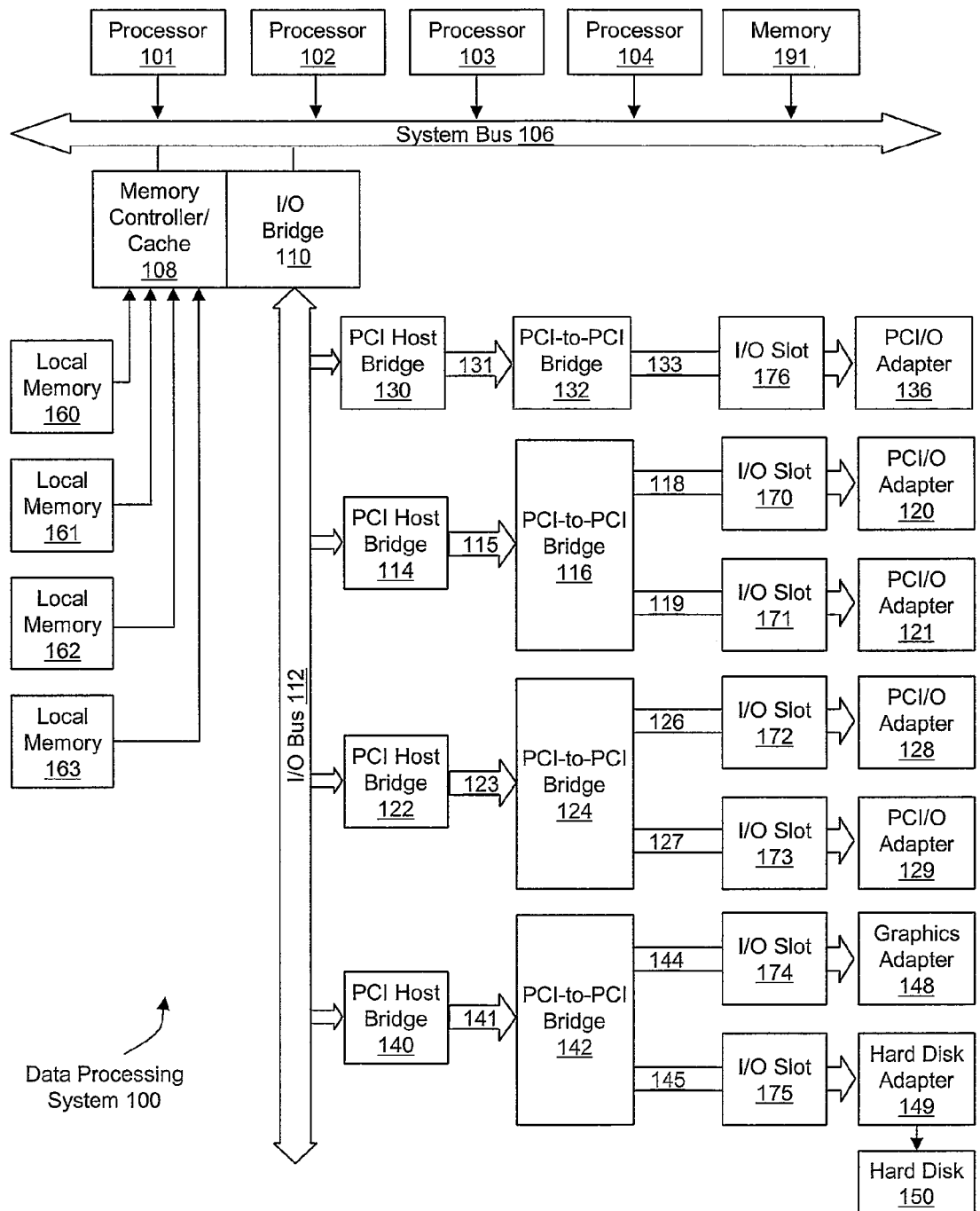
FIG. 1 is a block diagram illustrating an exemplary data processing system in which one embodiment of the present invention may be implemented.

Disclosed are systems, methods, and computer program products for managing processor entitlement of virtual processors in logical partitioned data processing system. In one embodiment, the invention concerns a method of managing processing resources in a data processing system. The method involves creating a plurality of virtual processors, and allocating a processing resource entitlement to each of the virtual processors of the plurality of virtual processors. The method also includes assigning the plurality of virtual processors to a workload, receiving a request by the workload for utilization of processing resources, and in response to said request dispatching a virtual processor of the plurality of virtual processors. The method further includes determining whether the dispatched virtual processor has exceeded its processing resource entitlement, and in response to determining that said virtual processor has exceeded its processing resource entitlement, undispatching said virtual processor.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figures. The specific reference numerals used are provided only to aid in the description and not meant to imply any limitations (structural or functional) on the invention. Unless otherwise explicitly stated, it is understood that the use of specific component, device, or parameter names are exemplary only and not meant to imply any limitations on the invention. The invention can be implemented with different terminology used to describe the components, devices, or parameters herein. Each term used herein is to be given its broadest interpretation given the context in which that term is used.

With reference now to the figures, and in particular with reference to FIG. 1, a block diagram of a data processing system suitable for implementing embodiments of the invention is depicted. Data processing system 100 may be a symmetric multiprocessor (SMP) system including a collection of processors 101, 102, 103, and 104 connected to a system bus 106. For example, data processing system 100 may be a server within a network. Alternatively, a single processor system may be employed. Also connected to system bus 106 is memory controller/cache 108, which provides an interface to a collection of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, 136, graphics adapter 148, hard disk adapter 149, each of host processors 101-104, and each of local memories 160-163 is assigned to one of N partitions, for example. Hence, processor 101, local memory 160, and I/O adapters 120, 128, and 129 may be assigned to a first logical partition; processors 102-103, local memory 161, and PCI I/O adapters 121 and 136 may be assigned to a second logical partition; and processor 104, local memories 162-163, graphics adapter 148, and hard disk adapter 149 may be assigned to a third logical partition.

Each operating system executing within data processing system 100 is assigned to a different logical partition. Thus, each operating system executing within data processing system 100 may access only those I/O units that are within its logical partition. Those with skill in the art will appreciate that the present invention does not limit the number of partitions in data processing system 100 to three, but may include any number of partitions.

I/O Bridge 110 is coupled to PCI Host Bridges 114, 122, 130, and 140 via I/O Bus 112. PCI-to-PCI Bridges 116, 124, 132, and 142 are connected to PCI Host Bridges 114, 122, 130, and 140 via PCI Buses 115, 123, 131, and 141 and further connect to I/O Slots 170-176 via PCI Buses 118, 119, 126, 127, 133, 144, and 145. I/O slots 170-176 provide interfaces for PCI I/O adapters 120, 121, 128, 129, 136, graphics adapter 148, and hard disk adapter 149. Hard disk adapter 149 couples hard disk 150 to I/O bus 110.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
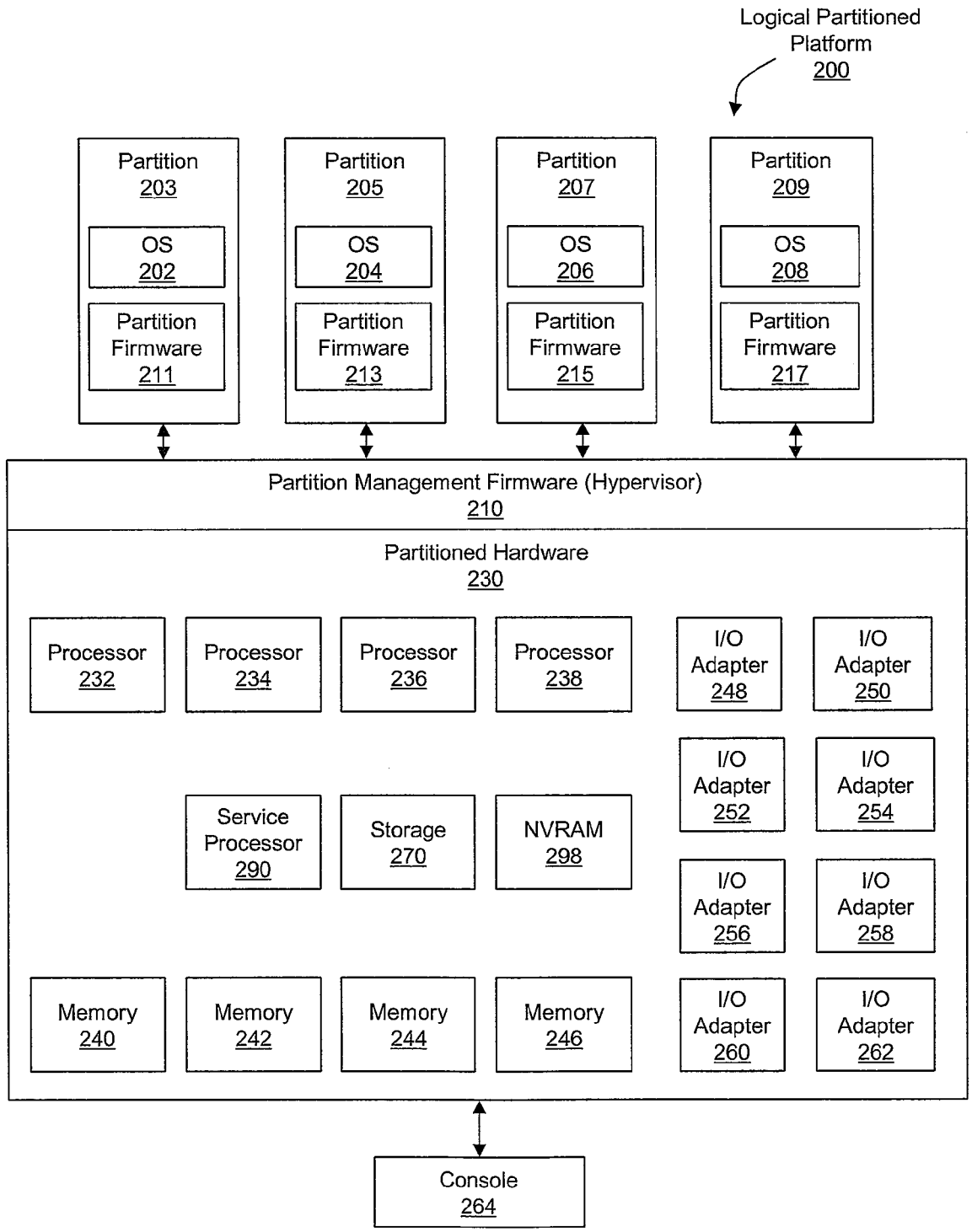
FIG. 2 is a block diagram of an exemplary logical system in which one embodiment of the present invention may be implemented.

With reference now to FIG. 2, a block diagram of an exemplary logical partitioned platform is depicted in which the present invention may be implemented. The hardware in logical partitioned platform 200 may be implemented with, for example, data processing system 100 of FIG. 1. Logical partitioned platform 200 includes partitioned hardware 230, operating systems (OS) 202, 204, 206, 208, and partition management firmware, also referred to herein as hypervisor 210. OS 202, 204, 206, and 208 may be multiple copies of a single operating system or multiple heterogeneous operating systems simultaneously running on platform 200. In one embodiment, these operating systems can be AIX™ or Linux™, which are designed to interface with a hypervisor. OS 202, OS 204, OS 206, and OS 208 are located in partitions 203, 205, 207, and 209, respectively.

Additionally, partitions 203, 205, 207, and 209 also include, respectively, partition firmware (PFW) 211, 213, 215, and 217, which provides functions that may be called by the operation system in the partition. When partitions 203, 205, 207, and 209 are instantiated, a copy of the partition firmware is loaded into each partition by hypervisor 210. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes NVRAM storage 298 service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor 210 allows the simultaneous execution of independent OS images 202, 204, 206, and 208 by virtualizing all the hardware resources of logical partitioned platform 200. Hypervisor software is available from International Business Machines Corporation. Firmware is "software" stored in a memory chip that holds content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Operations of the different partitions may be controlled through a hardware management console, such as console 264. Console 264 may be a separate data processing system from which a system administrator may perform various functions including reallocation of resources to different partitions.

Workloads of processors 232, 234, 236, and 238 may also be processed via one or more resource sets (RSET). An RSET is a group of virtual processors having a specific processor entitlement assigned to each virtual processor of the group. In one embodiment, no overlap between two distinct RSETs is permitted. When additional virtual processing resources are required, Hypervisor 210 may create a RSET and assign each virtual processor of the resource set to a specific processor entitlement.

Hypervisor 210 may also determine when dispatched one or more virtual processors of the RSET have exceeded their assigned processing resource entitlement, and may subsequently undispatch the RSET.

Hypervisor 210 may also restrict a workload to using only the assigned virtual processors within an RSET. Additionally, Hypervisor 210 may also determine a status of each virtual processor. The status of a virtual processor indicates to Hypervisor 210 if each of the virtual processors has a capped or uncapped task load. The status of the virtual processors may be used to determine where to dispatch or undispatch one or more virtual processors or RSETs.

Figure 3:
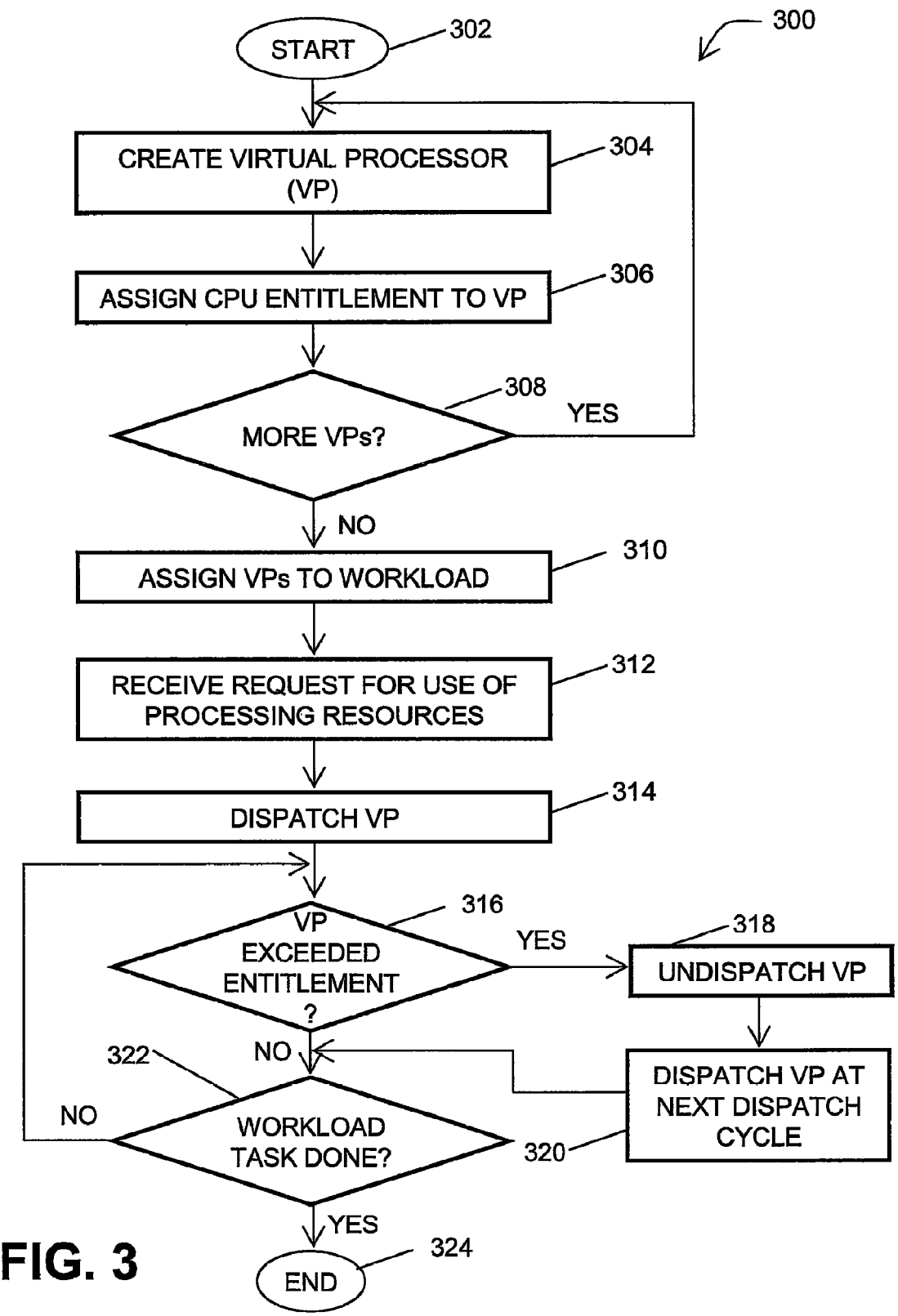
FIG. 3 is a flow chart of a process by which certain functionality of the invention can be implemented.

With reference now to FIG. 3, in which is illustrated a method 300 that can be implemented in data processing system 100, in conjunction with logical partitioned platform 200, will be described. In one embodiment, method 300 facilitates the management of processor entitlement for virtual processors of logical partitioned platform 200. In one embodiment, after a starting step (302), hypervisor 210 creates a virtual processor (VP) (304). Hypervisor 210 receives a CPU entitlement allocation and assigns the CPU entitlement allocation to the VP created (306). Next, hypervisor 210 inquires whether an additional VP is to be created (308). In response to an indication that an additional VP is to be created, method 300 continues at step 304.

Steps 304, 306, and 308 can be also understood as a subprocess of method 300 in which a resource set (RSET) is created. In one embodiment of method 300, when multiple RSETs are created, no VP overlap between any two distinct RSET created is allowed. The VPs are made exclusive so that external processes (unbound work) do not affect the actual entitlement assigned to the VPs of a given RSET.

After the resource set is created, hypervisor 210 assigns the RSET to a workload (310). In some embodiments, a given RSET may be permitted to overlap between different workload partitions; however, it is preferable in such instances to ensure that bound threads are together in a created RSET. Hypervisor 210 next receives a request by the workload to use processing resources (312). In response to said request, hypervisor 210 dispatches a virtual processor of the RSET assigned to the workload (314). Subsequently, hypervisor 210 determines whether the dispatched virtual processor has exceeded its assigned CPU entitlement (316). In response to a determination that the virtual processor has exceed its assigned CPU entitlement, hypervisor 210 undispatches the virtual processor (318) and delays dispatching the virtual processor until the next dispatch cycle (320). In the case where the virtual processor has not exceeded its assigned CPU entitlement, hypervisor 210 next inquires whether the workload task has been completed (322). If the workload task is not yet complete, method 300 continues at step 316. If the workload task has been completed, method 300 ends (324).

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of managing processing resources in a data processing system, the method comprising:
    a hypervisor creating a plurality of virtual processors in a logically partitioned data processing system having a plurality of logical partitions each executing a respective one of a plurality of operating system instances;
    allocating a respective processing resource entitlement of physical processing resources of the data processing system to each of the plurality of virtual processors;
    assigning at least one of the plurality of virtual processors to a workload running on an operating system instance in one of the plurality of logical partitions;
    determining a status of each of the plurality of virtual processors as having a capped or uncapped task load;
    receiving a workload request for utilization of the physical processing resources;
    the hypervisor determining if additional virtual processing resources in addition to the one or more virtual processors assigned to the workload are required to process the workload request;
    in response to determining that additional virtual processing resources are required, creating a first resource set, wherein the first resource set is a grouping of multiple of the plurality of virtual processors, wherein each virtual processor in the resource set has a respective allocated processing resource entitlement;
    the hypervisor dispatching one or more virtual processors of the first resource set to the workload request;
    determining whether the dispatched one or more virtual processors of the first resource set has exceeded its processing resource entitlement within a given virtual processor dispatch cycle based on the status of the one or more virtual processors of the first resource set as having a capped or uncapped task load; and
    in response to determining that the dispatched one or more virtual processors of first resource set has exceeded its processing resource entitlement, undispatching the first resource set within the given virtual processor dispatch cycle.

2. The method of claim 1, wherein the plurality of virtual processors are a first plurality of virtual processors, the method further comprising:
    creating a second plurality of virtual processors;
    allocating a processing resource entitlement to each of the virtual processors of the second plurality of virtual processors, wherein the virtual processors of the first plurality of virtual processors are not included in the second plurality of virtual processors, and wherein the virtual processors of the second plurality of virtual processors are not included in the first plurality of virtual processors; and
    creating a second resource set from multiple of the second plurality of virtual processors, wherein the second resource set does not have any virtual processor overlap with the first resource set.

3. The method of claim 2, further comprising restricting the workload request to using only the assigned virtual processors within the first resource set.

4. A data processing system comprising:
    one or more physical processors;
    a plurality of local memory coupled to the one or more physical processors; and
    a virtualization manager that, when executed on the one or more physical processors, causes the data processing system to perform:

establishing a plurality of logical partitions each executing a respective one of a plurality of operating system instances;

creating a plurality of virtual processors;

allocating a respective processing resource entitlement of the one or more physical processors of the data processing system to each of the plurality of virtual processors;

assigning at least one of the plurality of virtual processors to a workload running on an operating system instance in one of the plurality of logical partitions;

determining a status of each of the plurality of virtual processors as having a capped or uncapped task load;

receiving a workload request for utilization of the physical processing resources;

the hypervisor determining if additional virtual processing resources in addition to the one or more virtual processors assigned to the workload are required to process the workload request;

in response to determining that additional virtual processing resources are required, creating a first resource set, wherein the first resource set is a grouping of multiple of the plurality of virtual processors, wherein each virtual processor in the resource set has a respective allocated processing resource entitlement;

the hypervisor dispatching one or more virtual processors of the first resource set to the workload request;

determining whether the dispatched one or more virtual processors of the first resource set has exceeded its processing resource entitlement within a given virtual processor dispatch cycle based on the status of the one or more virtual processors of the first resource set as having a capped or uncapped task load; and in response to determining that the dispatched one or more virtual processors of first resource set has exceeded its processing resource entitlement, undispatching the first resource set within the given virtual processor dispatch cycle.

5. The data processing system of claim 4, wherein the virtualization manager further causes the data processing system to perform:

creating a second plurality of virtual processors;

allocating a processing resource entitlement to each of the virtual processors of the second plurality of virtual processors, wherein the virtual processors of the first plurality of virtual processors are not included in the second plurality of virtual processors, and wherein the virtual processors of the second plurality of virtual processors are not included in the first plurality of virtual processors; and creating a second resource set from multiple of the second plurality of virtual processors, wherein the second resource set does not have any virtual processor overlap with the first resource set.

6. The data processing system of claim 5, wherein the virtualization manager further comprises computer logic for restricting the workload request to using only the assigned virtual processors within the first resource set.

7. A computer program product, comprising:
a computer-readable storage medium; and
program code stored on the computer-readable storage medium that, when executed by a processor, causes a data processing system to:

create, via a hypervisor, a plurality of virtual processors in a logically partitioned data processing system having a plurality of logical partitions each executing a respective one of a plurality of operating system instances;

allocate a respective processing resource entitlement of physical processing resources of the data processing system to each of the plurality of virtual processors;

assign at least one of the plurality of virtual processors to a workload running on an operating system instance in one of the plurality of logical partitions;

determine a status of each of the plurality of virtual processors as having a capped or uncapped task load;

receive a workload request for utilization of the physical processing resources;

determine, by the hypervisor, if additional virtual processing resources in addition to the one or more virtual processors assigned to the workload are required to process the workload request;

in response to determining that additional virtual processing resources are required, creating a first resource set, wherein the first resource set is a grouping of multiple of the plurality of virtual processors, wherein each virtual processor in the resource set has a respective allocated processing resource entitlement;

dispatch, via the hypervisor, one or more virtual processors of the first resource set to the workload request;

determine whether the dispatched one or more virtual processors of the first resource set has exceeded its processing resource entitlement within a given virtual processor dispatch cycle based on the status of the one or more virtual processors of the first resource set as having a capped or uncapped task load; and in response to determining that the dispatched one or more virtual processors of first resource set has exceeded its processing resource entitlement, undispatch the first resource set within the given virtual processor dispatch cycle.

8. The computer program product of claim 7, wherein the program code further causes the data processing system to:

create a second plurality of virtual processors;

allocate a processing resource entitlement to each of the virtual processors of the second plurality of virtual processors, wherein the virtual processors of the first plurality of virtual processors are not included in the second plurality of virtual processors, and wherein the virtual processors of the second plurality of virtual processors are not included in the first plurality of virtual processors; and create a second resource set from multiple of the second plurality of virtual processors, wherein the second resource set does not have any virtual processor overlap with the first resource set.

9. The computer program product of claim 8, wherein the program code further causes the data processing system to restrict the workload request to using only the assigned virtual processors within the first resource set.

* * * * *